J. H. OGBURN.
FRUIT GATHERING VESSEL.
APPLICATION FILED OCT. 26, 1909.
953,009.
Patented Mar. 22, 1910.
2 SHEETS—SHEET 1.
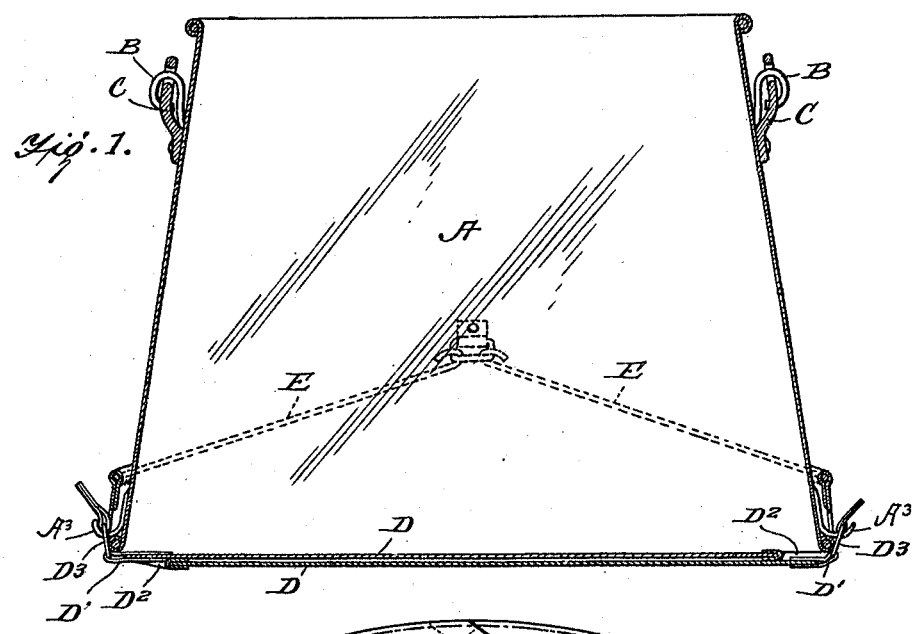
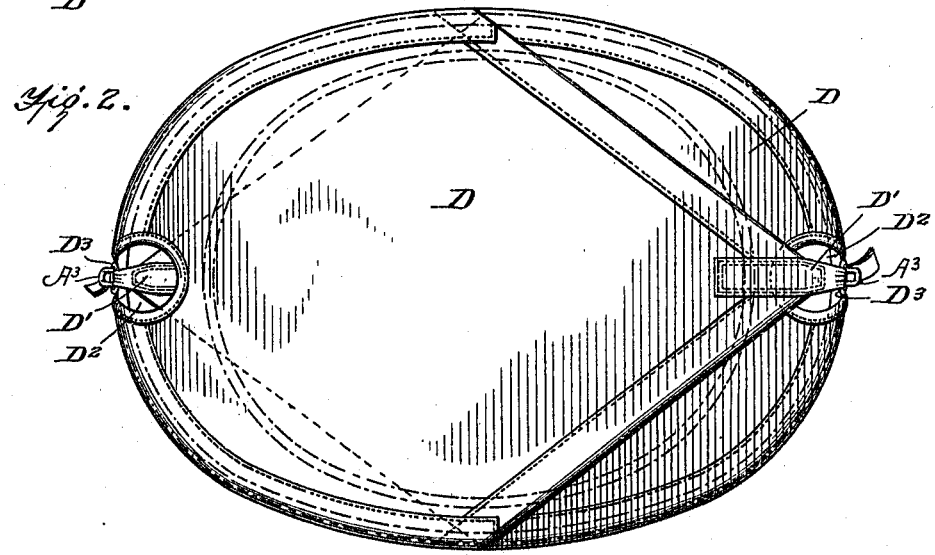
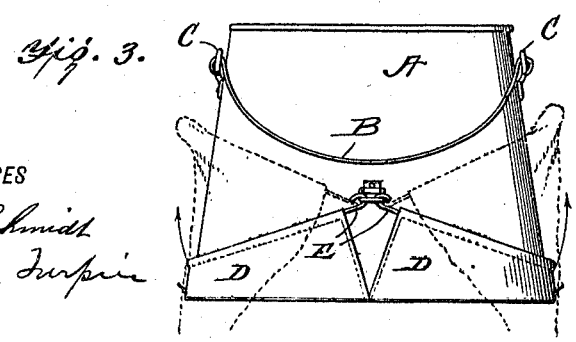
WITNESSES
INVENTOR
JOHN H. OGBURN,
BY
ATTORNEYS

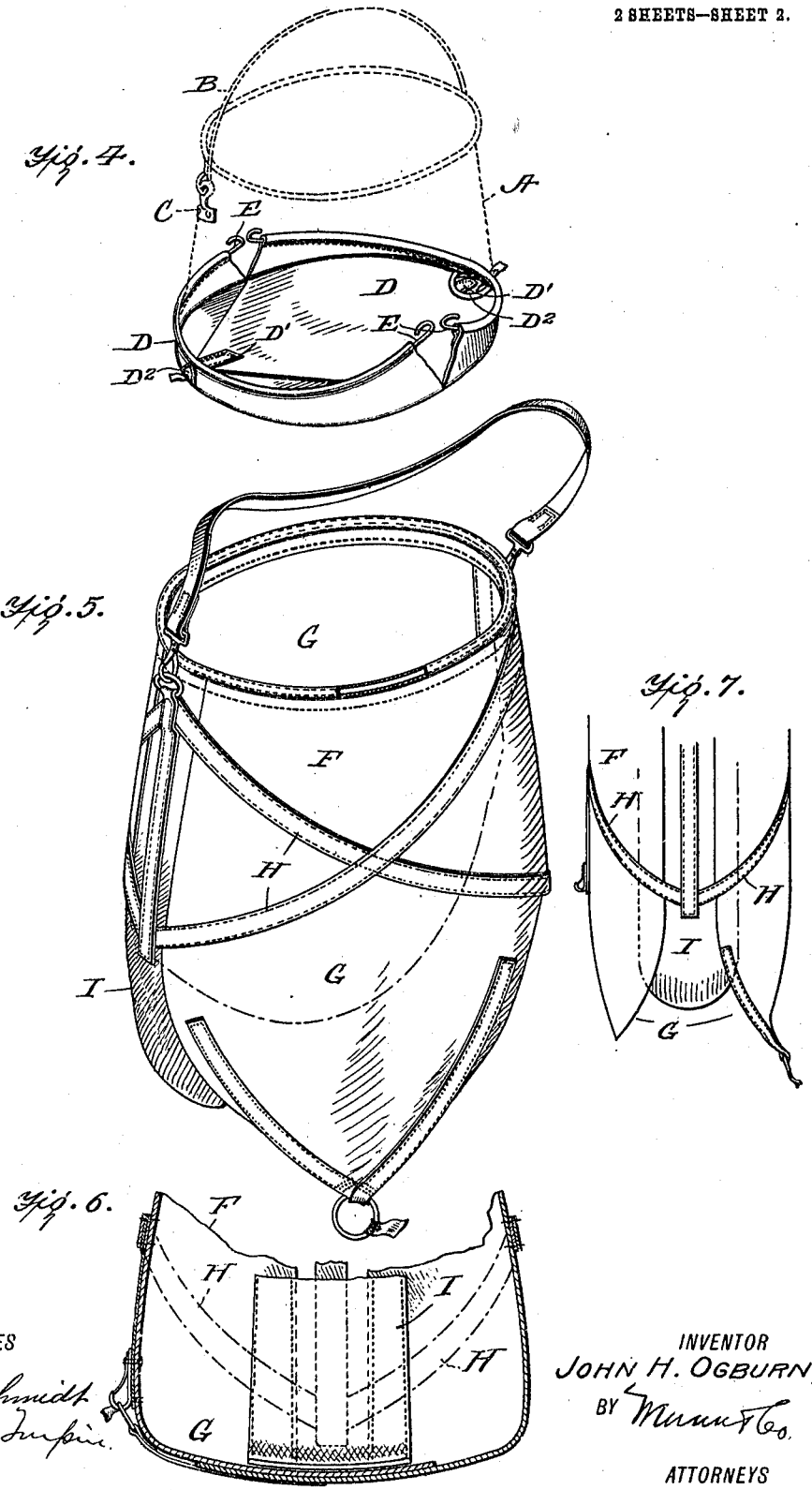

UNITED STATES PATENT OFFICE.

JOHN H. OGBURN, OF WENATCHEE, WASHINGTON.

FRUIT-GATHERING VESSEL.

953,009.        Specification of Letters Patent.    Patented Mar. 22, 1910.

Application filed October 26, 1909. Serial No. 524,605.

To all whom it may concern:

Be it known that I, JOHN H. OGBURN, a citizen of the United States, and a resident of Wenatchee, in the county of Chelan and State of Washington, have invented certain new and useful Improvements in Fruit-Gathering Vessels, of which the following is a specification.

This invention is an improvement in devices for use in gathering fruit, vegetables and the like and consists in certain novel constructions and combinations of parts as will be hereinafter described and claimed.

In the drawings Figure 1 is a vertical longitudinal section of a vessel embodying my invention. Fig. 2 is a bottom plan view thereof. Fig. 3 is a side view of the vessel. Fig. 4 is a perspective view of a bottom portion, the body of the vessel being shown in dotted lines and Fig. 5 is a perspective view showing a somewhat different construction from that presented in Fig. 1, the bottom in Fig. 5 being opened. Fig. 6 is a detail cross section across the bottom of the construction shown in Fig. 5 with the parts of the bottom in closed position, and Fig. 7 is an edge view of the lower portion of the construction presented in Fig. 5 with the portions of the bottom open.

In carrying out my invention, I employ what for convenience of reference I term a body portion which in Figs. 1 to 4 inclusive is in the form of a metal or other pail A which enlarges or tapers toward its lower discharge end so the fruit may be freely discharged therefrom without bruising by binding or choking in the discharge and the pail is preferably made of an elongated oval form in cross section as best shown in Fig. 2. This oval construction is preferable because it permits of the placing of a vessel of maximum capacity down in a box when it is desired to discharge the fruit from the vessel by opening the bottom, these boxes being usually rectangular as is well understood and the vessels may be made of such capacity that a given number of vessels full of fruit will fill the box.

The pail in the construction shown in Figs. 1 to 4 inclusive may be made of tin, galvanized iron or other sheet metal or other suitable material and when made in the oval form as described can be conveniently nested for shipment when the bottoms are open.

The bail like handle B is secured to the pail A at the ends thereof preferably by means of the ears C which are located substantially below the upper end of the pail so that they are out of the way and will not strike fruit when the same is being placed in the pail and will be so located as to avoid in a large degree any tilting of the pail when it is held against the person of the user and supported by means of a shoulder or neck strap caught in these ears but will permit the pail to rest flat against the person and the ears being located at the ends of the pail or in a line with the major axis of the oval, the latter affords the maximum space into which to place the hands in filling the pail with both hands as will be understood by those accustomed to this class of work.

The bottom of the pail is made of flexible material such for instance as canvas or other cloth or leather or other flexible material suitable for the purpose.

As shown the bottom is composed of two sections D which are released or opened by drawing them apart in opposite directions and these sections when closed lap one upon the other extending across the bottom of the vessel and one or both of the sections are secured by fastening devices in connection with the pail. The sections are thus fastened at what might be termed their free ends detachably in connection with the pail and at their other ends they are connected with the pail. This connection is preferably movable relatively to the pail and is effected by means of carriers E which are in the form of bails of wires or rods pivotally connected at their ends with the pail usually mid-way between the ends of the broad sides of the pail and arranged to swing between the open and closed positions shown in full lines and indicated in dotted lines in Fig. 3 of the drawings. When the bottom is closed, the bails at their middle or crown portions swing down nearly to the bottom of the pail and when pulled up from the said position in the act of opening the pail they swing up toward the top of the pail and spread the bottom sections toward the ends of the pail as shown. This affords a free opening at the bottom of the pail through which the fruit may be emptied or dumped without rolling or pouring the contents of the fruit which rolling or pouring tends to bruise, scratch or otherwise injure the fruit or other delicate substances in the handling of which great care is necessary. This is of special importance in handling fruit for shipment long distances as is now commonly practiced especially in the handling of the high class apples, peaches and pears of the far Northwest and in the handling of delicate oranges and the like.

Fastenings are provided for securing the bottom sections when closed and these fastenings may be at the free ends of one or both of the bottom sections and it is preferable to provide the fastenings in connection with both of the bottom sections so that no matter how the same are adjusted, that is to say no matter which one of the sections is outermost when the bottom is closed, a fastening is provided and both sets of fastenings may be utilized in securing a bottom of unusual strength. As shown, the sections conform generally to the bottom of the pail and are provided at their free ends with tongues $D'$ and each of the sections is provided near its outer end with an opening $D^2$ through which the tongue $D'$ of the uppermost section may project, the tongue being provided at its free end with a loop $D^3$ engaging with a hook $A^3$ on the pail, such hook and loop constituting the fastening devices in the specific embodiment of the invention as herein illustrated.

By connecting the outer ends of the bottom sections with the pail through the aid of movable carriers which may be constructed as before described, I am able in opening the bottom to adjust the sections thereof practically clear of the lower end of the pail or body so they afford no substantial obstruction to the ready discharge of the fruit as will be understood from the foregoing description.

It may be in some instances, desirable, to make the body portion of flexible material, such for instance as canvas and I illustrate such a construction in Figs. 5, 6 and 7 wherein the body portion F of the vessel is shown of canvas and its bottom sections G are in the form of extended portions of said body and when closed overlap each other and may be drawn apart in opposite directions in opening the bottom of the vessel. In this construction, I reinforce the flexible body F by means of straps H and I provide end closures I between the adjacent edges of the bottom sections G and one or both of the bottom sections G may be provided with fastening devices coöperating with mating fastening devices on the body F in holding the bottom sections in closed position. This construction may be desirable in some instances and for some uses and may be regarded as within the broad principles of my invention.

I claim:

1. A fruit picker's vessel substantially as herein described comprising a pail of oval form in cross section, and enlarging toward its lower end to facilitate the free discharge of the fruit at such point, a bottom for said pail composed of flexible sections, carrier bails pivoted at their ends adjacent to each other to the pail and having the outer ends of said bottom sections secured to their respective bails whereby the latter when lifted will draw the bottom sections to open position, the said bottom sections lapping one upon the other below the pail in the closed position of the bottom, and said sections being provided at their free ends with tongue-like extensions and adjacent to their outer ends with openings through which the tongue-like extensions of the complementary sections may project and fastening devices for securing the said bottom sections in closed position substantially as set forth.

2. A fruit picker's vessel comprising a pail open at the bottom, a bottom composed of flexible sections slidable one upon the other below the bottom of the vessel, means for securing the bottom in closed position, and carriers for the outer ends of the bottom sections and consisting of bails pivoted at their ends to the pail and swinging up and down relatively thereto whereby they may be operated to open the bottom substantially as set forth.

3. The combination in a fruit picker's vessel, of a pail, a flexible bottom section adapted to extend substantially across the bottom of the pail, means operating in connection with the free end of said bottom section for securing same in closed position and a carrier for the other end of said section movable relatively to the pail whereby it may be operated to open the bottom section substantially as set forth.

4. The combination with a pail of a bottom composed of two sections overlapping below the pail and adapted to be opened by drawing the said sections apart in opposite directions, carriers for the outer ends of said sections, and movable relatively to the pail, and means operating in connection with the other ends of the sections for securing the same in closed position substantially as set forth.

5. A fruit picker's vessel having a bottom composed of sections of canvas or the like overlapping below the bottom of the vessel, said sections being movable bodily relatively to the vessel, bails connecting the outer ends of the sections with the pail and means for securing the bottom in closed position.

6. The combination of a body a flexible bottom therefor composed of two sections provided each at their free ends with tongue-like extensions and near their other ends with openings through which the tongue-like extensions on the coöperating sections may protrude, and bail-like carriers connecting the sections with the body substantially as set forth.

7. A fruit picker's vessel comprising a body portion with an opening at its bottom and a bottom therefor consisting of flexible sections lapping one upon the other in the closed position of the bottom, said bottom sections each being secured at one end in connection with the body and said connections being at the opposite sides of the latter and provided at their free ends with means whereby they may be detachably secured to the body and each of the sections extending substantially across the bottom, substantially as set forth.

8. The combination in a fruit picker's vessel, of a body portion, a flexible bottom section a bail connected with one end of the bottom section and movable relative to the body portion, and fastening devices for securing the other end of the bottom section detachably to the body portion, substantially as set forth.

9. The combination in a fruit picker's vessel, of a body portion, a flexible bottom section therefor, a carrier connecting the outer end of the said section with the body and movable relatively to the latter, and fastening means for detachably securing the other end of the section to the body.

10. The combination in a fruit picker's vessel, of a body portion, a bottom section and a bail connecting said section at one end with the body portion, the free end of the bottom section and the body portion being provided one with a loop and the other a hook for coöperation in securing the bottom section in closed position, substantially as set forth.

11. The combination, substantially as herein described, of a practically inflexible pail open at the bottom and a flexible bottom section therefor movable bodily across the open bottom end of the pail, substantially as set forth.

12. A vessel comprising a pail open at its lower end and tapering from the lower end to the upper end, a bottom section for said pail and a carrier bail for said section and pivoted at its ends to the pail, the tapering form of the pail facilitating the movement of the bail in opening the bottom and affording a stop for the bail when the bottom is adjusted to closed position, substantially as set forth.

13. A fruit picker's vessel comprising a body portion open at the bottom, a flexible bottom for the body and movable bodily relatively thereto and a bail swinging relatively to the body and forming a carrier for the flexible bottom, substantially as set forth.

JOHN H. OGBURN.

Witnesses:
SOLON C. KEMON,
PERRY B. TURPIN.